No. 620,283.  
E. W. COWAN & A. STILL.  
REGULATING TRANSFORMER.  
(Application filed Dec. 29, 1897.)  
Patented Feb. 28, 1899.

(No Model.)

Witnesses:  
Inventors:  
Edward Woodrowe Cowan  
Alfred Still  
By their Attorneys.

UNITED STATES PATENT OFFICE.

EDWARD WOODROWE COWAN AND ALFRED STILL, OF BOWDON, ENGLAND.

REGULATING-TRANSFORMER.

SPECIFICATION forming part of Letters Patent No. 620,283, dated February 28, 1899.

Application filed December 29, 1897. Serial No. 664,215. (No model.)

*To all whom it may concern:*

Be it known that we, EDWARD WOODROWE COWAN and ALFRED STILL, residing at Bowdon, Chester county, England, subjects of the Queen of Great Britain and Ireland, have invented Improvements in Regulating-Transformers, (which have been patented to us in part in Great Britain under No. 7,142, sealed on August 13, 1895, as of April 8, 1895,) of which the following is a specification.

Our invention provides means whereby the fall in terminal secondary pressure of the said regulating-transformer which occurs at full load, due to self-induction and magnetic leakage between the primary and secondary circuits, is materially reduced; and a further part of our invention provides means whereby the magnetizing-current of the primary coil is reduced in certain positions of the movable core relatively to that of the fixed core.

Figure 1:
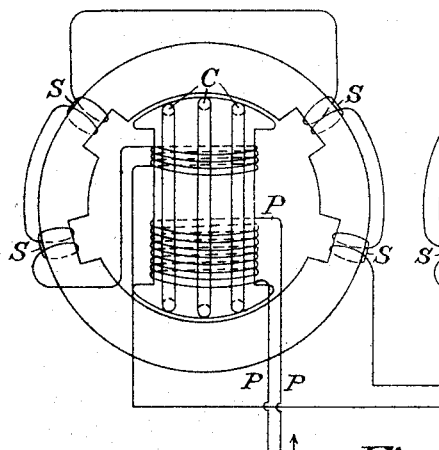
Figure 2:
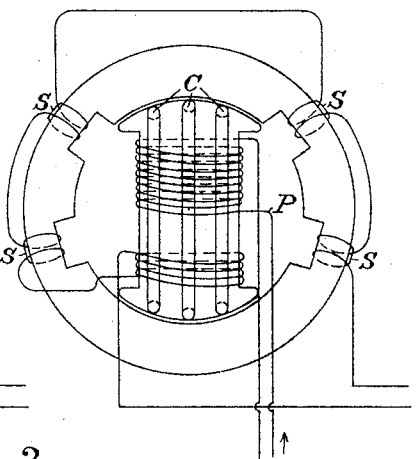
Figure 3:
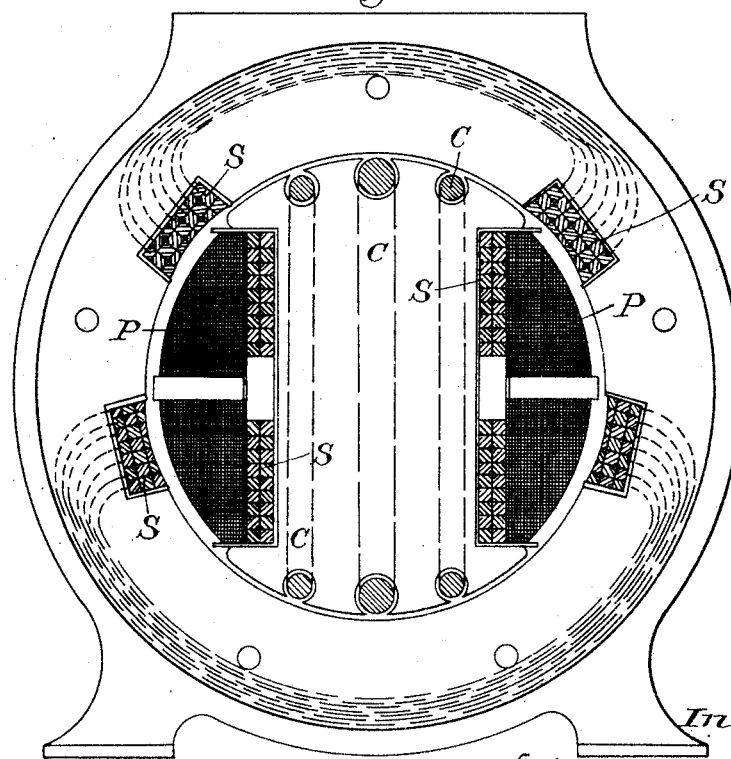

In the drawings, Figure 1 is a diagram of our invention, showing the movable core with its winding in the position of maximum effect. Fig. 2 is a similar view with the core turned through one hundred and eighty degrees from the position of Fig. 1. Fig. 3 is a transverse sectional view through the transformer.

We effect the improvement referred to by winding a portion, approximately half, of the secondary winding, together with the primary winding, on the movable core, the effect of which is to reduce the number of secondary coils which are placed on the fixed core, in which latter position they tend to set up magnetic leakage, and consequently there arises a drop of pressure at the terminals of the secondary winding. The action of the apparatus is then as follows: In the position of the maximum effect the shuttle is in a vertical position, and the magnetic flux set up by the primary winding cuts both the secondary turns on the shuttle and those on the ring in a positive sense. In the position of minimum effect the shuttle is revolved through an angle of one hundred and eighty degrees, and the magnetic flux then cuts the secondary coils on the shuttle in a positive sense and those on the ring in a negative sense. These effects being practically equal and opposite, the resultant electromotive force in the complete secondary circuit is *nil.*

In intermediate positions of the shuttle relatively to the ring the resultant electromotive force in the secondary circuit is intermediate.

If it is desired that the regulating-transformer should, when connected up as a "feeder-regulator" or "booster," subtract as well as add electromotive force, it is necessary to alter the ratio of members of secondary turns on the shuttle relatively to those on the ring, so that the position of no effect is reached before the shuttle has traveled through one hundred and eighty degrees. Between that position and one hundred and eighty degrees the volts will be subtracted from the circuit in series with the secondary of the transformer, the maximum amount of subtracting depending on the number of secondary turns on the rings in excess of those on the shuttle.

We effect the second part of our invention—viz., the reduction of magnetizing current in certain positions of the shuttle relatively to the ring—by using a minimum number of slots in the fixed core and by placing the slots in such positions on the fixed core that the area of the air-gap is in all positions of the movable core relatively to the fixed core as large and as equal as possible—*i. e.*, so that no two gaps and the secondary winding therein coincide with the axis of the movable part at the same time.

In connection with these improvements we may use short-circuited or shading coils on the shuttle, so as to screen the magnetic flux set up by the secondary coils on the fixed core, and thereby reduce their self-induction, which results in fall of pressure, and these shading-coils are preferably so placed as to shade or oppose the induction due to the secondary coil on the ring in the recesses which are, in some positions of the shuttle, bridged by the pole-pieces of the movable core.

Fig. 1 shows diagrammatically the movable core or shuttle with its winding in the position of maximum effect, the secondary turns on the shuttle acting with the secondary turns on the ring. Fig. 2 shows diagrammatically the opposite position in which the shuttle being turned through one hundred and eighty degrees the secondary turns on the shuttle are opposed to those on the ring. Fig. 3 shows a transverse section through such a transformer with the primary coils wound over the secondary coils on the shuttle, the winding of the secondary coils in this case on the ring being a drum-winding.

In Fig. 1 the arrangement of the windings and "short-circuited" or "shading" coils is diagrammatically shown. S is the secondary, and P the primary, winding, though we do not confine ourselves to the form of secondary winding shown on the diagram, but sometimes prefer to wind that portion of the secondary circuit which is wound on the ring-shaped core in the form known as "drum-winding."

In the drawings there are also shown short-circuited or shading coils C on the movable core or shuttle. They are wound with their axes at right angles to the axis of the primary winding, and each coil L, which is independent of the others, may consist either of a single turn or a number of turns, the resistance being kept as small as possible.

In Fig. 3 the recesses for the secondary winding on the ring are arranged as shown in the drawings, being placed in such positions that no two recesses and the winding therein are opposite to one another in any diameter. Thus taking into consideration their width and the width of the pole-pieces of the movable core there is always a comparatively large area of pole-piece from which the magnetic flux can pass into the stationary ring, and there is thus the smallest possible air-gap resistance in any position between minimum and maximum effect, thus insuring that the maximum magnetizing current shall be as small as possible.

Having now particularly described and ascertained the nature of this said invention and in what manner the same is to be performed, we declare that what we claim is—

1. A regulating-transformer comprising a fixed portion forming part of an iron circuit and a movable portion forming remaining part of said circuit, secondary winding carried partly by the fixed and partly by the movable part, the said parts being so arranged that in one position of the movable part the two parts of the secondary winding shall act against each other, and in another position they shall act with each other, substantially as described.

2. A regulating-transformer comprising a fixed portion and a movable portion forming parts of an iron circuit and having secondary winding partly on the fixed portion and partly on the movable portion of the iron circuit, recesses on the inner periphery of the fixed part of the iron circuit for the reception of the secondary winding, spaced so that no two recesses are in axial juxtaposition at the same instant with the pole-pieces of the movable part of the magnetic circuit, substantially as described.

3. A regulating-transformer comprising a fixed portion forming part of an iron circuit and a movable portion forming the remaining part of said circuit, a primary winding a secondary winding partly on the fixed and partly on the movable part and short-circuiting or shading coils C of low resistance arranged with their axes transversely to the winding of the primary coil, substantially as described.

In testimony whereof we have signed our names to this specification in the presence of two subscribing witnesses.

EDWARD WOODROWE COWAN.
    ALFRED STILL.

Witnesses:
 WILLIAM PANCRAS HAMLYN,
 GEORGE EDWARDS BROADNATH.